INVENTORS:
RICHARD F. GROSSMAN
JOSEPH C. GUINAN

United States Patent Office 3,573,146
Patented Mar. 30, 1971

3,573,146
TAPE SPLICE CONSTRUCTION
Joseph C. Guinan, Troy, and Richard F. Grossman,
Voorheesville, N.Y., assignors to Norton Company,
Troy, N.Y.
Filed Aug. 18, 1969, Ser. No. 850,934
Int. Cl. B32b 7/04, 7/10
U.S. Cl. 161—36          8 Claims

ABSTRACT OF THE DISCLOSURE

An improved butt splice is provided in pressure-sensitive adhesive tapes and in release liners used in combination with such tapes. A protective tape is provided in combination with a splice cover tape in which the adhesive mass has less adhesion to the backing member of the splice cover tape and to the backing member of the tape or release liner to be butt spliced than does the adhesive mass of the succeeding wrap of tape in a roll thereof to the backing member of the protective tape. Thus during rapid unwinding of the protective tape will be picked off leaving the splice cover tape in position and the splice undisturbed.

BACKGROUND OF THE INVENTION

(1) Field of the invention

The present invention relates in general to splicing. More particularly, it relates to butt splices in pressure sensitive adhesive tapes and in release liners used in combination with such tapes.

(2) Description of the prior art

Pressure sensitive adhesive tapes are in general manufactured by coating a wide web with a suitable adhesive composition in solvent solution. Afterwards, the coated web is heated thus evaporating the solvent and leaving the web with a pressure-sensitive adhesive mass. The thus formed adhesive web is then wound upon itself to form a large jumbo roll which may contain several hundred yards. Subsequently the adhesive web is unwound from the jumbo roll, slit to desired commercial widths and wound into shorter length rolls.

During manufacture and subsequent handling by converters, it often becomes necessary, because of various defects, to cut out portions of the adhesive web and then to splice together the cut ends. In pressure-sensitive adhesive tapes or webs which are subject to considerable tension in a longitudinal direction either during manufacture or in customer use butt splices are commonly employed. With such splice the two free cut ends, generally cut so as to provide a cut edge perpendicular to the lengthwise direction of the tape, are placed adjacent and butting one another and a strip of splicing tape is placed over the adhesive coated surface of the free ends. The splicing tape bridges the free ends together and extends across the width of the tape spliced. Such tape usually is of the double coated type.

Although there are certain advantages in the use of this type of splice, its use is also attendant with certain disadvantages. Frequently, in such splice the cut ends of the tape are apart slightly and adhesive from the overlying layer of tape in the roll flows into the crevice thus formed. Often this results in tearing of the tape backing or delamination of the tape and adhesive mass on unwinding.

The above-mentioned problem has been avoided to a considerable extent by the provision of a splice cover tape as disclosed by J. F. Ruffer in U.S. Pat. No. 3,135,642. This patent is assigned to Norton Company, assignee of the present application. However, in certain instances during storage in roll form the adhesive mass on the splice cover tape flows out from under the backing member thereof thus resulting in contact with the adhesive mass of the succeeding wrap of tape. The contacting adhesive masses often fuse together thus resulting in, during unwinding, pick off of the splice cover tape. Such pick off is occasioned frequently with tearing of the tape backing member, delamination, or otherwise destruction of the joint.

If the rapid unwind occurs during printing or other conversion of the tape after which it is rewound, the splice, in the event tearing or the like has not occurred, will be buried within the roll without a splice cover. In such event, the potential for the problem above-mentioned originally returns and in case the adhesive of the succeeding wrap of tape fuses to the adhesive of the splicing tape tearing or delamination is almost certain to occur during rapid unwinding when the splice is reached.

The same problem resulting in pick off of splice cover tapes is found in butt splices made in release liners used in combination with some pressure sensitive adhesive tapes. In the case of release liners for double coated tapes the problem is accentuated because the splice in the liner is made with a splice cover tape on both sides and both splice cover tapes are in contact with a pressure-sensitive adhesive mass.

These splicing problems have caused difficulties during manufacture resulting in lost production time and increased operating costs and have been a cause of complaint by converters and other users.

SUMMARY OF THE INVENTION

By our invention the splicing problems and disadvantages above-mentioned are substantially reduced. This is accomplished by producing in a pressure-sensitive adhesive tape and/or a release liner an improved butt splice.

In general our improved splice provides in combination with the splice cover tape a protective tape which, during unwinding, is picked off rather than the splice cover tape. Thus tearing and delamination of the tape and/or liner is avoided resulting in fewer problems during manufacture and conversion and greater customer acceptance of the tape.

The above feature is accomplished in general by providing on the protective tape an adhesive mass which has less adhesion to the backing member of the splice cover tape and the backing member of the tape of the liner to be spliced than the adhesion of the adhesive mass in the overlying wrap of tape in a roll thereof to the backing member of the protective tape.

BRIEF DESCRIPTION OF THE DRAWING

The invention will be better understood by reference to the drawing in which like numerals refer to the same parts in the various views and in which.

DETAILED DESCRIPTION OF THE INVENTION

Figure 1:
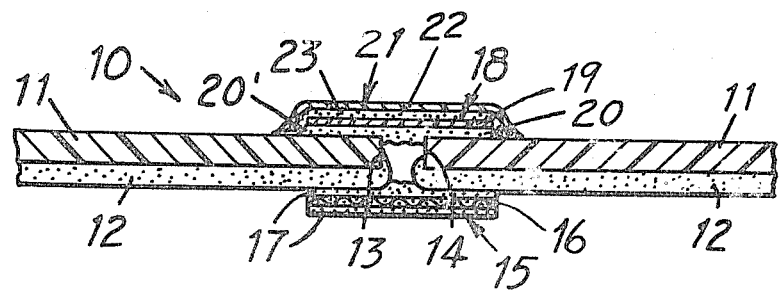
FIG. 1 is a cross-sectional view of two free ends of pressure-sensitive adhesive tape butt spliced in accordance with our invention.

Turning now to the drawing there is disclosed in FIG. 1 thereof a pressure-sensitive adhesive tape 10 having a backing member 11 and an adhesive mass 12 on the front side of the backing member.

As shown in the drawing free ends 13, 14 of tape 10 are butted together so as to form a joint in the pressure-sensitive adhesive tape. While ideally the free ends are in contact with one another, more realistically there is a gap or crevice therebetween as indicated. In storage this crevice is often filled by adhesive mass 12 flowing therein, or the adhesive masses, hereinafter described, of the splicing or splice cover tapes.

Splicing of the two free ends 13, 14 together is effected by means of splicing tape 15. This tape, which in the drawing is a double face tape comprises a backing member 16 and an adhesive mass 17 on each side thereof. If desired, however, a single face tape can be utilized. In the latter event the tape usually is so placed, to avoid gapping in the finished tape, that the same direction as the adhesive mass of the tape to be spliced.

The drawing in FIG. 1, for the sake of clarity, shows splicing tape 15 on top of adhesive mass 12; however, in actuality such tape is embedded in the adhesive mass on the tape ends to be spliced thereby forming more or less a continuous layer of adhesive.

On the opposite side of pressure-sensitive adhesive tape 10 and in bridging contact with free ends 13, 14 is positioned splice cover tape 18. This tape is of single coated construction and has on backing member 19 a pressure-sensitive adhesive mass 20.

Splice cover tape 18 as indicated in the drawing, is located ideally, as is splicing tape 15, so as to extend equidistantly longitudinally from the joint line formed by butting ends 13, 14. However, in actuality such accurate positioning is often not attained. The tapes should, however, overlap the ends to some extent so as to provide good bonding engagement therebetween. An overlap of about ½ to 2 inches, depending on application, is generally found satisfactory. While not shown in the drawing, both splicing tape 15 and splice cover tape 18 extend laterally across free ends 13, 14 so as to be coextensive with backing member 11.

Superposed above splice cover tape 18, as indicated in FIG. 1 of the drawing, and laterally coextensive with such tape is protective tape 21. This tape includes backing member 22 on the front-side of which is coated adhesive mass 23. Protective tape 21 must, in order to prevent contact between flow out adhesive mass 20 and adhesive mass 12 in overlying wraps in a roll of tape, extend in a direction longitudinally from the joint formed by free ends 13, 14 to a greater extent than does splice cover tape 18. In practice, we have found that if the protective tape extends longitudinally about ¼ inch past the ends of the splice cover tape, a satisfactory butt splice results.

In practice of our invention, satisfactory butt splices may be produced with various adhesive masses and backing members. Merely by way of example, the backing member of the various tapes above-mentioned may be any of various materials conventionally used in the manufacture of pressure-sensitive adhesive tapes. These include saturated paper, flexible films such as cellulose acetate, regenerated cellulose, polyvinyl chloride, polyethylene terephthalate and the like and woven cloth backings of natural or man-made fibrous materials. The backing member of the protective tape, however, should be of a material readily tearable, e.g. such as regenerated cellulose and cellulose acetate. In contrast, the backing member of the splice cover tape should not be readily torn, polyethylene terephthalate film being preferably used. A particularly suitable backing member for the splicing tape is a woven glass cloth such as is disclosed in the above-mentioned Ruffer patent. The adhesive mass may be any of the pressure-sensitive adhesive masses conventionally used. Such include natural or synthetic rubbers combined with tackifying resins, e.g. a rosin ester; esters of acrylic acid which are inherently normally tacky and pressure sensitive; polyisobutylene; alkyl vinyl ether polymers; and the like. However, regardless of the specific materials used in the practice of the invention adhesive mass 23 must have considerably less adhesion to backing members 11 and 19 than does adhesive mass 12 to backing member 22. Moreover, adhesive mass 20 must bond tenaciously to backing member 11 thus offering greater adhesion therewith than that between adhesive mass 23 and backing member 19.

If the above requirements are satisfied, when adhesive mass 20 flows out from backing member 19 (as indicated by reference numeral 20') on being stored in roll form, on unwinding the overlying wrap will pick off the protective tape rather than the splice cover tape.

Various other components conventionally used in the manufacture of pressure-sensitive adhesive tapes can be used within the inventive concept. For example, the use of a primer may be desirable in the splicing tape or it may be desirable to alter the release properties between the protective tape adhesive mass and the splice cover tape backing member by providing on such backing member a low adhesion or release coat offering high release to the protective tape mass. In still another fashion a release coat could be provided on the backing member of the tape to be spliced which offers at the same time high release with respect to the adhesive mass of such tape and high adhesion with respect to a splice cover tape adhesive mass.

Figure 2:
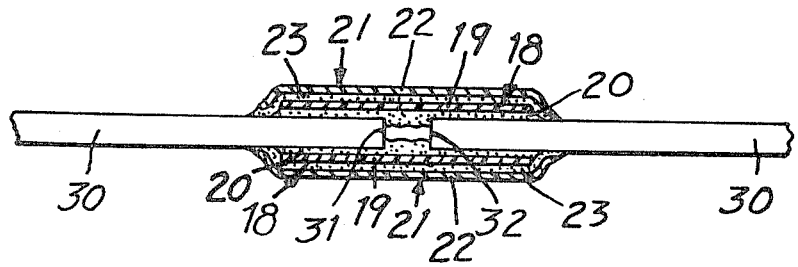
FIG. 2 is a cross-sectional view of a release liner used in the winding of double faced pressure-sensitive adhesive tape spliced with our novel butt splice.

In accordance with a further aspect of our invention, a specific embodiment thereof is shown in FIG. 2 of the drawing. Therein is provided a release liner 30 in which two free ends 31, 32 are spliced together. The free ends, in butting contact as shown, are joined together by means of splice cover tape 18. Such tape is applied on both sides of the release liner with adhesive mass 20 in contact with the liner. Superposed above each of the splice cover tapes is protective tape 21. Such release liner when used in combination with a double coated pressure-sensitive adhesive tape will permit pick off of the protective tape by succeeding or overlying wraps in a roll of tape during unwinding of the tape in subsequent operations.

Obviously such improved splice as we have invented may be used in the splicing of release liners of various materials. The only requirement in this connection is that splice cover tape 18 adhere to the release liner 30 to a greater extent than does protective tape 21 to the backing member of the splice cover tape and the adhesion between the protective tape adhesive mass and backing member of the splice cover tape and between such adhesive mass and the release liner be less than the adhesion between the adhesive mass of the pressure-sensitive adhesive tape with which the liner is interleaved and the protective tape backing member. Merely by way of example, the release liner can be a backing member possessing low adhesion characteristics per se, e.g. a polyethylene or polytetrafluoroethylene film or it can be a backing member coated with a composition possessing release characteristics. In the latter category is the commercially available silicone resin coated fibrous substrates. The composition of the adhesive mass on the splice cover tape and the protective tape as well as the backing members thereof can be such as desired, so long as the above-mentioned requirements are met. Examples of adhesive masses are given above in connection with the description of the specific embodiment of the invention relating to pressure sensitive adhesive tapes.

The following specific examples will illustrate more clearly the preferred embodiments of our invention.

EXAMPLE I

Two free ends of conventional pressure-sensitive adhesive web (48 inches wide) having a backing of 4 mil rope paper (basis weight—30 lbs.) and an adhesive mass on the front side thereof comprising equal parts by weight of natural rubber and polyisoprene with the usual tackifying resins, fillers, antioxidants and curing agents were butter together in the usual fashion preparatory to forming a butt splice. On the back side of the adhesive web was coated a release composition comprising an acrylic ester-acrylonitrile-styrene. Such release composition is available in aqueous emulsion from B. F. Goodrich Chemical Co. under the trade designation Hycar 2600X91. To the thus butted free ends was applied a double coated splicing tape of the type disclosed in Ruffer's above-mentioned United States patent.

The splicing tape was manufactured by coating, in the usual fashion, a 2 mil Dacron polyester cloth backing member (106 x 65 end/inch) on both sides with an adhesive composition similar to that above-mentioned, no fillers being used in the composition. Such composition, was applied from a solution (20% by weight solvent) thereof in a mixed aromatic-aliphatic hydrocarbon solvent. (Tolu-Sol available from Shell Chemical Co.) On drying, the adhesive mass is agressive and permanently tack with relatively low cold flow.

The splicing tape, cut to appropriate size (1½" x 48"), was applied in such manner that it was embedded in the adhesive mass of the pressure-sensitive tape and bridged together the two free ends. The tape extended equidistant longitudinally in each direction from the joint line and was laterally coextensive with the pressure sensitive adhesive tape.

On the reverse side of the coated rope paper backing member was applied transversely a splice cover tape (1½" x 48"), such tape comprising a backing member of 1 mil polyethylene terephthalate film coated on the front side with a high tack natural rubber-tackifying resin pressure-sensitive adhesive. Such an adhesive is disclosed in U.S. Pat. No. 2,410,079. On the reverse side of the film was coated a release composition comprising a cross-linked polydimethyl siloxane polymer. This release composition is available from General Electric Company and is applied conventionally in toluene solution. Such composition is identified commercially by the trade designation SS–4001 plus cross-linking agent SS–4012 and is disclosed in U.S. Pat. No. 2,985,546.

The splice cover tape was applied so as to be laterally coextensive with the pressure-sensitive adhesive tape backing member and to extend the same distance longitudinally on both sides of the joint line formed by the butted free ends.

Over the splice cover tape was applied a protective tape having a 1½ mil (2" x 48" wide) regenerated cellulose film backing member. Such film provided on the reverse side with a low adhesion coating comprising a copolymer of vinyl acetate and stearyl maleate, as described in U.S. Pat. No. 2,816,655, was coated on the front side with an adhesive composition comprising a mixture of 80 parts by weight of a terpolymer of equal weights of vinyl acetate, ethyl acrylate, and 2-ethylhexyl acrylate; 20 parts by weight of a homopolymer of butyl acrylate; and 50 parts by weight sucrose acetate isobutyrate. A simliar adhesive composition is disclosed in Webber's U.S. Pat. No. 3,307,963. These coatings, as is conventional in the pressure sensitive adhesive tape art, were applied by roll coating means from solvent solution. The solvents used in this example being ethyl acetate and toluene respectively, however, other solvents are equally suitable, e.g. hexane or MEK.

The adhesion of this adhesive composition to the above-mentioned polydimethyl siloxane release coating on the splice cover tape and to the release coating on the tape backing to be spliced is very low. On the other hand, the adhesion between the adhesive mass of the tape to be spliced and the low adhesion coating on the backing of the protective tape is relatively high which in combination with the high degree of adhesion between the high tack rubber resin adhesive mass of the splice cover tape to the backing member of the tape to be spliced permits in rapid unwinding the protective tape to be picked off without removal of the splice cover tape.

Such splice has been found to hold satisfactorily under all conditions encountered subsequent to manufacture of this tape, e.g. unwinding, cutting to desired width and rewinding in shorter lengths; unwinding, printing, and rewinding; etc. By way of comparison, however, in the same type pressure-sensitive adhesive tape when splices are made without the protective tape, splice breakage on rewinding is very common.

EXAMPLE II

A splice cover tape was prepared by continuously coating, according to usual techniques, the front side of a commercially available silicone coated paper with a pressure-sensitive silicone adhesive. The adhesive used is sold by the General Electric Company under the trade designation "SR–520" and is described in U.S. Pat. No. 2,857,356. However, other pressure-sensitive silicone adhesives may be used such as those disclosed in U.S. Pat. No. 2,814,601. This adhesive material was applied from solution (30% in toluene). The solution, also containing 0.3% by weight of 2,4-dichloro-benzoyl peroxide, was deposited in sufficient quantity to result in an adhesive mass, on drying, of 1.5 oz./sq. yd. After deposit, the solvent was evaporated from the adhesive composition and the composition was cured by heating for 10 minutes at 150 to 250° F. and then for an additional 2 minutes at 300° F.

The silicone coated paper is commercially available from Paterson Parchment Paper Company under the trade designation "Patapar 55–197." This coated paper is a super calendered kraft paper (55 lb. basis weight unsaturated) believed to be coated with "Syl-OFF," a silicone coating composition available from Dow Corning Corporation. Such a release composition is disclosed in U.S. Pat. No. 2,927,870.

The thus formed splice cover tape was characterized by having a backing of high release properties and an adhesive mass which bonds well to the silicone release coatings used on commerutially available release liners for pressure sensitive adhesive tapes.

Two free ends of a release liner, available commercially from Weyerhauser Company under the trade designation "Stick-Not 662," were butted together preparatory to application of the splice cover tapes. Such release liner is a silicone coated paper such as that above described; however, the release composition is coated on both sides of the paper. To both sides of the butted free ends were applied transversely splice cover tapes to which had been laminated previously, in conventional fashion, protective tapes such as mentioned in Example I. The tapes were laminated together in such fashion that the splice cover tape was centered between the longitudinal edges of the protective tape. On application the laminated tapes were laterally coextensive with the liner and the splice cover tape extended ¾ inch in a longitudinal direction on both sides of the joint formed by the free ends. The protective tape, superposed above the splice cover tape extended on both sides of the butt joint about ¼ inch more than did the splice cover tapes. The splice cover tape and protective tape, it will readily be observed, may be applied separately, if so desired.

In practice release liners so spliced used in combination with a variety of double coated tapes have proven very satisfactory. These include backing members of paper, polyethylene terephthalate film and polyvinyl chloride foam double coated with an aggressively tacky adhesive mass. On unwinding such tapes or adhesive coated webs, the protective tapes may be picked off, particularly after ageing, by the adhesive mass of the overlying and underlying wraps leaving the splice cover tapes intact. In contrast, however, release liners spliced without the protective tape in combination with the splice cover tape have frequently resulted in either a torn liner or tape breakage requiring work stoppage and resulting in loss of product and lost production time.

As many different embodiments of our invention will readily occur to those skilled in the pressure-sensitive adhesive tape art, it is to be understood that the specific embodiments of the invention as presented herein are intended by way of illustration only and not limiting on the invention but that the limitations thereon are to be determined only from the appended claims.

What we claim is:

1. In a pressure-sensitive adhesive tape comprising a backing member having on the front side thereof a mass of pressure-sensitive adhesive and having at least one butt-splice therein, said splice comprising two free ends of the tape in butting engagement, a splicing tape laterally coextensive and in contact with said adhesive mass, the splicing tape bridging said free ends and extending some distance longitudinally in both directions therefrom, said splicing tape comprising a backing member and a pressure-sensitive adhesive mass on at least one side of said backing member, said adhesive mass on at least one side being in contact with the first mentioned mass of pressure-sensitive adhesive, and a splice cover tape comprising a backing member having on the front side thereof a pressure-sensitive adhesive mass, the splice cover tape being laterally coextensive with the tape ends to be spliced and extending some distance longitudinally in both directions therefrom, said adhesive mass of said splicing tape in bridging contact with the back side of said free ends, the improvement comprising in combination with said splice cover tape a protective tape, said protective tape comprising a backing member having on the front side thereof a pressure-sensitive adhesive mass, the adhesive mass of said protective tape being in contact with the back side of the backing member of said splice cover tape, said protective tape being coextensive laterally with said splice cover tape and extending longitudinally in both directions from said butted free ends a distance greater than said splice cover tape, the adhesive mass of said protective tape having less adhesion to the backing member of said splice cover tape and to the backing member of said pressure-sensitive tape than the adhesion of the adhesive mass of the pressure-sensitive tape to the backing member of the protective tape.

2. Pressure-sensitive tape according to claim 1 wherein the adhesive mass of said protective tape is a mixture comprising 80 parts of a terpolymer of equal weights of vinyl acetate, ethyl acrylate, and 2-ethylhexyl acrylate; 20 parts of a homopolymer of butyl acrylate; and 50 parts of sucrose acetate isobutyrate.

3. Pressure-sensitive tape according to claim 2 wherein said splicing tape comprises a backing member having a backsize thereon comprising a polydimethyl siloxane polymer.

4. Pressure-sensitive tape according to claim 3 wherein the adhesive mass on said splicing tape comprises a high tack natural rubber-tackifying resin adhesive composition.

5. A release liner having at least one butt splice therein suitable for use in a double coated pressure-sensitive adhesive tape comprising a backing member and a pressure-sensitive adhesive mass on each side thereof, said butt splice comprising two free ends of the liner in butting engagement, a splice cover tape located on each side of the liner coextensive therewith and bridging said free ends, and a protective tape laterally coextensive with said liner overlying each said splice cover tape and extending longitudinally in both directions from said free ends a distance greater than said splice cover tape, said protective tape comprising a backing member having on one side thereof a pressure-sensitive adhesive mass, the adhesive mass being in contact with said splice cover tape and having less adhesion to the splice cover tape and to the liner than does the adhesive mass of said pressure-sensitive adhesive tape to the backing member of the protective tape.

6. Release liner according to claim 5 in which said liner comprises a backing member having on each side thereof a release coating composition comprising a dimethyl siloxane polymer.

7. Release liner according to claim 6 in which said splice cover tape comprises an unsaturated paper backing member having on the backside thereof a release coating composition comprising a cross-linked polydimethyl siloxane and on the front side an adhesive mass comprising a pressure-sensitive silicone adhesive.

8. Release liner according to claim 7 in which the protective tape comprises a backing member having on the front side an adhesive mass comprising a mixture comprising 80 parts of a terpolymer of equal weights of vinyl acetate, ethyl acrylate, and 2-ethylhexyl acrylate; 20 parts of a homopolymer of butyl acrylate; and 50 parts sucrose acetate isobutyrate and on the back side thereof a release composition comprising a copolymer of vinyl acetate and stearyl maleate.

References Cited

UNITED STATES PATENTS

| | | | |
|---|---|---|---|
| 2,993,823 | 7/1961 | Wilson | 161—36 |
| 3,135,642 | 6/1964 | Ruffer | 161—36 |
| 3,307,963 | 3/1967 | Webber | 117—685 |
| 3,394,799 | 7/1968 | Ritson et al. | 161—167 |

MORRIS SUSSMAN, Primary Examiner

U.S. Cl. X.R.

117—68.5, 122; 161—167